No. 868,174. PATENTED OCT. 15, 1907.
A. FINCH.
FORCE FEED LUBRICATOR.
APPLICATION FILED DEC. 18, 1905.

Witnesses
A. G. Hague
J. B. Smutney

Inventor
Abram Finch
by Orwig & Lane attys

UNITED STATES PATENT OFFICE.

ABRAM FINCH, OF BOONE, IOWA, ASSIGNOR OF ONE-HALF TO A. W. MORGAN, OF PERRY, IOWA.

FORCE-FEED LUBRICATOR.

No. 868,174.  Specification of Letters Patent.  Patented Oct. 15, 1907.

Application filed December 18, 1905. Serial No. 292,251.

*To all whom it may concern:*

Be it known that I, ABRAM FINCH, a citizen of the United States, residing at Boone, in the county of Boone and State of Iowa, have invented a certain new and useful Force-Feed Lubricator, of which the following is a specification.

The object of my invention is to provide a force feed lubricator of simple, durable and inexpensive construction especially designed for use in connnection with machinery subjected to rapid movement.

More specifically it is my object to provide means for positively locking the forcing plug against unscrewing movements without interfering with the movements required to screw up the plug as required to force the lubricant out of the oil receptacle.

My invention consists in the construction, arrangement and combination of the various parts of the device, whereby the objects contemplated are attained, as hereinafter more fully set forth, pointed out in my claims and illustrated in the accompanying drawings, in which—

Figure 1:
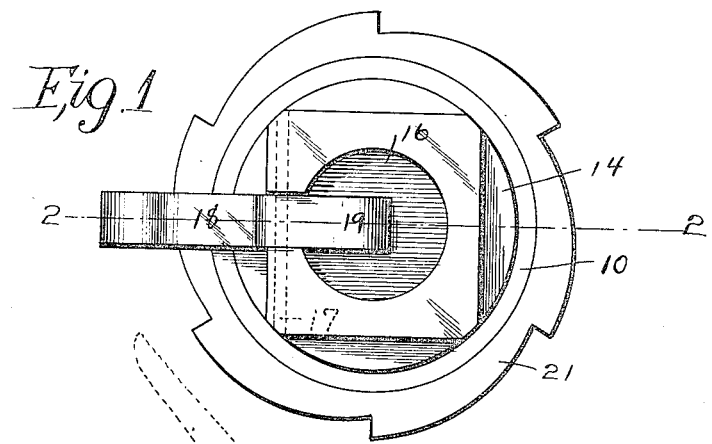
Figure 2:
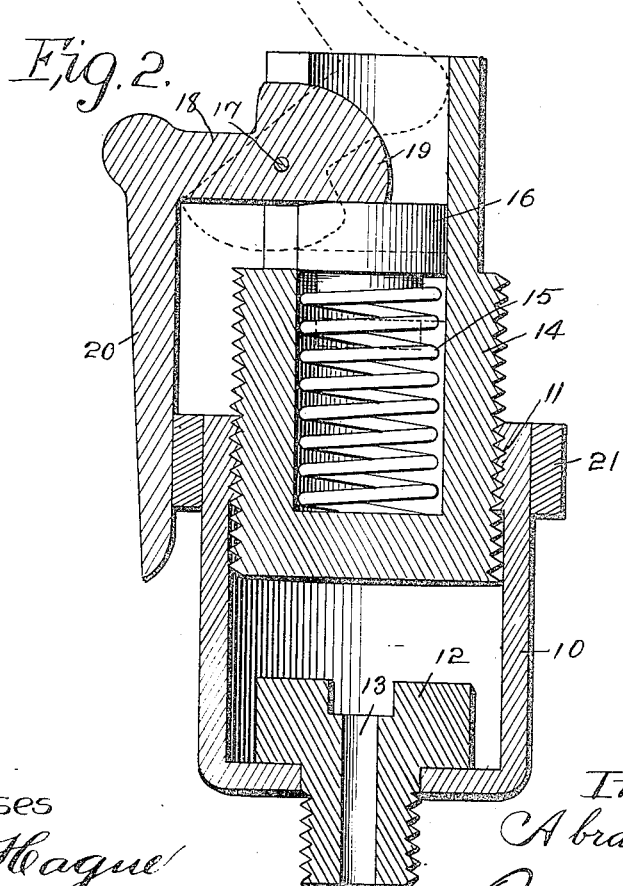

Figure 1 shows a top or plan view of a device embodying my invention, and Fig. 2 shows a central, sectional view of same on the line 2—2 of Fig. 1.

Referring to the accompanying drawings, I have used the reference numeral 10 to indicate the oil receptacle formed with an open top and having an internal screw-threaded portion 11 near its upper end. At its bottom is an opening through which a screw 12 is projected and said screw is provided with a longitudinal oil passageway 13. In connecting the oil receptacle to a machine element to be lubricated, the screw 12 is projected through the bottom of the oil receptacle and screwed into the machine element, thus clamping the bottom of the oil receptacle firmly against the machine element and providing communication from the oil receptacle through the opening in the screw.

The forcing plug comprises a body portion 14, the lower end of which is screw-threaded to engage the screw-threaded part 11 of the oil receptacle. The top of the plug is made angular to receive a wrench. I have formed a cylindrical opening in the plug extending from its top downwardly and in this opening is an expansible spring 15 engaging a cylindrical block 16. The upper portion of the plug is formed with a slot at one side and mounted in this slot is a lever fulcrumed to the pin 17. This lever comprises a body portion 18 with a cam-shaped end 19 arranged within the opening of the plug and with a right angled extension or handle 20 on the outer end of the part 18. The block 16 is normally held by its spring upwardly against the inner end of the lever, thus tending to hold the pawl or lever portion 20 toward the side of the oil receptacle. The said pawl or handle portion may be grasped and moved outwardly and upwardly against the pressure of the spring to the position shown by dotted lines in Fig. 2, and when in this position, it will be yieldingly held from returning by the spring and block engaging it, as shown by dotted lines in said figure. Furthermore, it will project above the plug so far that an operator would readily and easily see it and would not be likely to neglect to return it to the position shown by solid lines in Fig. 2. Formed on or fixed to the exterior of the oil receptacle near its upper end is a ratchet rim 21 to be engaged by the pawl or handle 20. The teeth of said ratchet rim are so arranged that the plug may be turned freely in the direction required for screwing it into the oil receptacle and during this movement, the pawl or handle 20 will engage only the inclined portions of the ratchet rim. However, a movement of the plug in the direction required for unscrewing will be prevented because the pawl or lever 20 will then engage the shoulders of the ratchet rim and firmly lock the plug against unscrewing movements.

In practical use and assuming the cup to be secured to a machine element to be lubricated, the operator first fills the interior of the cup with hard-oil or the like and then screws the plug partially in the cup. He then places the pawl or handle 20 in position in engagement with the ratchet rim. Obviously no matter how much vibration is imparted to the cup, the plug cannot turn in the direction required for unscrewing it and, therefore, the plug cannot be shaken out of the cup. If it is desired to force some of the oil from the cup, the operator grasps the top of the plug with a wrench and turns it as far as may be desired, permitting the pawl or handle to move from one ratchet tooth to the other. This operation of screwing the plug into the cup may be easily and quickly done and the operator need pay no attention to the ratchet device. If it is desired to remove the plug, the operator moves the pawl or handle 20 to an upwardly projecting position where it is held yieldingly by the spring. It is desirable that the pawl or handle project a considerable distance above the plug, so that the operator may readily see it and remember to move it to position in engagement with the ratchet rim when it is desired to have the plug locked in the cup.

Having thus described my invention, what I claim and desire to secure by Letters Patent of the United States, therefor is—

1. In a force feed lubricator, the combination of a cup having a discharge opening, a ratchet rim extending around the top of the cup, a screw plug in the cup, a pawl pivoted to the screw plug and capable in one position of engaging the ratchet rim and in another position of standing upwardly above the plug, there being a cam-shaped extension on the pawl and a yielding pressure device carried by the plug to engage the cam-shaped extension and to yieldingly hold the pawl in engagement with the ratchet rim when the pawl is in one position and also to yieldingly hold the pawl in its upwardly extended position when placed therein.

2. A force feed lubricator, comprising a cup, a ratchet rim on the exterior thereof at its upper end, a feed plug screwed into the cup, there being an angular extension at the top of the plug, said plug and extension formed with an opening from its top extending downwardly into the plug, an extensible spring in the opening, a block at the top of the spring, a pawl fulcrumed in the top of the extension of the plug and having on one end a cam-shaped extension to engage the block and on its other end a right-angled extension or handle, said spring and block co-acting with the cam-shaped extension to yieldingly hold the handle portion in engagement with the ratchet rim when it is extending downwardly and also to yieldingly hold it in an upwardly inclined position after it is placed in such position.

3. A force feed lubricator, comprising a cup to receive oil formed with a discharge opening at its bottom, a ratchet rim around the exterior of its top and a screw-threaded portion around the interior of its upper end, a plug screwed into the top of the cup and formed with an angular extension at its top, said extension slotted at one side, a lever fulcrumed in the slot and formed with a downwardly projecting pawl or handle to engage the ratchet rim and also formed with an inwardly extending cam-shaped portion, said lever capable of swinging to a substantially upright position and a yielding pressure device contained within the plug to yieldingly hold the lever against the ratchet when it is extended downwardly and to also yieldingly hold the lever in an elevated position when it is extended upwardly.

Des Moines, Iowa.

ABRAM FINCH.

Witnesses:
S. F. CHRISTY,
J. RALPH ORWIG.